(12) United States Patent
Hosokawa et al.

(10) Patent No.: US 6,370,970 B1
(45) Date of Patent: Apr. 16, 2002

(54) CARGO HANDLING MACHINE INCLUDING FORCE CONTROL

(76) Inventors: Satoshi Hosokawa; Hiromitsu Satoh, both of c/o 11 Morikami, Sobue-cho, Nakashima-gun, Aichi Pref. 495 (JP)

( * ) Notice: Subject to any disclaimer, the term of this patent is extended or adjusted under 35 U.S.C. 154(b) by 0 days.

(21) Appl. No.: 09/391,263

(22) Filed: Sep. 7, 1999

Related U.S. Application Data

(63) Continuation-in-part of application No. 09/271,489, filed on Mar. 18, 1998.

(51) Int. Cl.[7] .................................... G01L 5/00
(52) U.S. Cl. ...................... 73/862.56; 73/816
(58) Field of Search .................. 73/862.381, 862.391, 73/862.56, 774, 816

(56) References Cited

U.S. PATENT DOCUMENTS

| | | | |
|---|---|---|---|
| 3,709,381 A | 1/1973 | Sullivan et al. | 214/11 R |
| 4,835,966 A * | 6/1989 | Kauss et al. | 60/376 |
| 5,261,026 A * | 11/1993 | Tomaru et al. | 388/847 |
| 5,328,153 A * | 7/1994 | Levinson | 254/2 R |
| 5,505,043 A * | 4/1996 | Baginski et al. | 60/477 |
| 5,716,028 A | 2/1998 | Evans et al. | 244/137.1 |
| 5,862,663 A * | 1/1999 | Lanza et al. | 60/432 |
| 6,065,619 A | 5/2000 | Miyata et al. | 212/286 |
| 6,073,496 A | 6/2000 | Kühn et al. | 73/862.56 |

FOREIGN PATENT DOCUMENTS

| | | |
|---|---|---|
| JP | 9-175800 | 7/1997 |
| JP | 10-072198 | 3/1998 |
| JP | 10-072200 | 3/1998 |
| JP | 10-095600 | 4/1998 |
| JP | 10-236800 | 9/1998 |

* cited by examiner

*Primary Examiner*—Max Noori
(74) *Attorney, Agent, or Firm*—Wood, Phillips, VanSanten, Clark & Mortimer

(57) ABSTRACT

The present invention aims at improving operability of a cargo handling machine by applying thereto a force control method. According to the force control method, a force sensor detects an anti-gravitational lift force that makes it possible to raise the cargo by holding an operating section, a hoisting force of the cargo handling machine is amplified in accordance with the lift force and the cargo is raised or lowered by the lift force and the hoisting force.

4 Claims, 8 Drawing Sheets

CARGO HANDLING MACHINE INCLUDING FORCE CONTROL

This application is CIP of 09/271,489 filed Mar. 18, 1998.

FIELD OF THE INVENTION

The present invention is directed toward a cargo handling machines having an elevation mechanism of a parallelogram link type or a jib type for raising and lowering cargoes when driven by an actuator such as an air cylinder or an electric motor.

BACKGROUND OF THE INVENTION

A previously employed cargo handling machine of this kind uses an air cylinder or an electric motor as a drive source for raising and lowering cargoes. The cargo handling machine using the air cylinder as a drive source adopts either a balance control method or a flow rate control method. The cargo handling machine using the electric motor as a drive source generally adopts either a speed control method or a positioned control method.

However, the aforementioned previously employed control methods provide some inconveniences, which will hereinafter be described. According to the balance control method, a cargo is raised or lowered by constantly supplying the air cylinder with an air pressure corresponding to the weight of the cargo. Since the pressure supplied to the cylinder needs to be set in advance in accordance with the weight of the cargo, it is difficult to consecutively handle various cargoes that differ in weight. Although it is possible to consecutively handle various cargoes that differ in weight using a complex circuit structure and a complex mechanism, this countermeasure causes cost increases in the machine, as well as response deterioration in the machine. In a state where a cargo is suspended in the air, if the air pressure supplied to the cylinder is switched to a value corresponding to a state where no cargo is suspended, the cargo falls almost freely. Consequently, there is a possibility of the cargo or an operator being seriously damaged.

The flow rate control method adjusts a flow rate of air by controlling an opening degree of a flow rate control valve disposed between an air source and a cylinder and thereby makes it possible to raise and lower a cargo. In the course of a transfer from an elevation state to a stationary state, the flow rate control method stops the cargo from moving by closing the flow rate control valve to fix the amount of air in the cylinder. Therefore, an inertia force that serves to raise or lower the cargo is applied to an elevation mechanism immediately after closure of the flow rate control valve. Such an inertia force destroys the balance between the pressure applied to the cylinder and the weight of the cargo. In other words, in transferring from an upward movement to a stationary state, the elevation mechanism keeps moving further upwards due to the inertia force even if the flow rate control valve is closed. As a result, the pressure applied to the cylinder becomes lower than a pressure that is balanced against the weight of the cargo, and the elevation mechanism descends due to the elimination of the inertia force. Accompanied by a repetition of such a process, the bound phenomenon is attenuated and the cargo is finally stopped. Since the flow rate control method invariably causes the aforementioned bound phenomenon, it is inevitable to sacrifice the operability to a certain extent.

Furthermore, the balance control method and the flow rate control method stop the elevation mechanism if a neutral state is achieved in response to cancellation of instructions. The instructions to raise and lower the cargo are based on a neutral point which is indispensable in these methods. The neutral point constitutes an insensitive range. As a result, the cargo may move at an unexpectedly high speed due to excessive input of an instruction signal resulting from a delay in responding to an instruction due to the insensitive range. Should the cargo fall to the floor, there is a possibility of the elevation mechanism arms leaping up high into the air. Although a damper may be used to inhibit the arms from leaping up, the operations of raising and lowering the cargo are adversely affected due to the addition of the operational force of the damper.

The speed control method and the positional control method make it possible to raise and lower cargoes by driving the electric motor based on a speed instruction signal and a positional instruction signal respectively. The cargo is raised or lowered at a speed corresponding to an instruction signal regardless of the weight of the cargo. Since the operator is unable to detect the weight of the cargo, the aforementioned methods are disadvantageous in terms of security. For example, when an instruction is issued to raise a cargo suspended in the air, the operator may not refrain from canceling the instruction even if the cargo interferes with peripheral equipments. This is because the operator cannot detect the increased resistance to the raising of the cargo. As a result, an excessively great external force is applied to the cargo and there is a possibility of the cargo falling to the floor and being damaged.

Still further, as is the case with the aforementioned flow rate control method, the speed control method and the positional control method stop the elevation mechanism if a neutral state is achieved in response to cancellation of instructions. The instructions to raise and lower the cargo are based on a neutral point which is also indispensable in these methods. The neutral point constitutes an insensitive range in raising or lowering the cargo. Therefore, the operation of raising or lowering the cargo invariably starts from the insensitive range. As a result, the cargo may move at an unexpectedly high speed due to excessive input of an instruction signal resulting from a delay in responding to an instruction.

SUMMARY OF THE INVENTION

In order to eliminate one or more of the aforementioned inconveniences, the present invention provides a cargo handling machine utilizing a force control method and including an elevation mechanism for raising and lowering a cargo, a drive source for driving the elevation mechanism, a control section having an electropneumatic proportional valve for controlling the drive source and an operating section having a force sensor, wherein the force sensor detects an anti-gravitational lift force generated by a user holding the operating section. A hoisting force of the cargo handling machine is amplified in accordance with the lift force and the cargo is raised or lowered by the lift force and the hoisting force.

In accordance with one aspect of the invention, a cargo handling machine includes an elevation mechanism to raise and lower cargo, a drive source for driving the elevation mechanism to raise and lower a cargo, an operating section coupled to the elevation mechanism and having a force sensor arranged to transmit a signal indicative of a vertical force applied to the operating section by a user, a detector coupled to the elevation mechanism to transmit a signal indicative of the vertical direction of movement of the elevation mechanism, and a control section having an electropneumatic proportional valve for controlling the drive source. The control section is configured to operate the cargo handling machine in a first mode wherein the control section causes the drive source to generate a hoisting force that is amplified in accordance with the signal from the force sensor, and a second mode wherein the hoisting force is reduced at an attenuated time rate of change in response to a decrease in the signal from the force sensor and a signal from the detector indicating vertically downward movement of the elevation mechanism.

In one aspect of the invention, a cargo handling machine includes an elevation mechanism to raise and lower a cargo, a force cylinder for driving the elevation mechanism to raise and lower a cargo, an operating section coupled to the elevation mechanism and having a force sensor arranged to transmit a signal indicative of a vertical force applied to the operating section by a user, a detector coupled to the elevation mechanism to transmit a signal indicative of the vertical speed and direction of movement of the elevation mechanism, and a control section having an electropneumatic proportional valve for controlling the force cylinder and a flow rate switching valve. The control section is configured to operate the cargo handling machine in a first mode wherein the control section causes the force cylinder to generate a hoisting force that is amplified in accordance with the signal from the force sensor, and a second mode wherein the control section causes the flow rate switching valve to limit the rate of air supplied to the cylinder so as to limit a speed at which the cargo ascends.

In one aspect, a cargo handling machine includes an elevation mechanism to raise and lower a cargo; a force cylinder for driving the elevation mechanism to raise and lower a cargo; an operating section coupled to the elevation mechanism and having a force sensor arranged to transmit a signal indicative of a vertical force applied to the operating section by a user; and a switch selectively activated by the user; and a control section having an electropneumatic proportional valve for controlling the force cylinder, and a flow rate switching valve. The control section is configured to operate the cargo handling machine in a first mode wherein the control section causes the force cylinder to generate a hoisting force that is amplified in accordance with a signal from the force sensor, and a second mode wherein the control section causes the flow rate switching valve to limit the flow rate supplied to the force cylinder so as to limit the speed at which the cargo ascends or descends.

In one aspect, a cargo handling machine includes an elevation mechanism to raise and lower a cargo, a force cylinder for driving the elevation mechanism to raise and lower a cargo, a force cylinder for driving the elevation mechanism to raise and lower a cargo, an operating section having a force sensor arranged to transit a signal indicative of a vertical force applied to the operating section by a user, an acceleration detector coupling the operating section to the elevation mechanism and transmitting a signal indicative of the vertical acceleration of the operating section, a detector coupled to the elevation mechanism to transmit a signal indicative of the vertical direction of movement of the elevation mechanism, and a control section having an electropneumatic proportional valve for controlling the force cylinder, a pressure regulating valve for supplying a preselected fluid pressure, and an electromagnetic valve for selectively introducing the preselected pressure from the pressure regulating valve to an upper chamber of the force cylinder. The control section is configured to operate the cargo handling machine in a first mode wherein the control section causes the drive source to generate a hoisting force that is amplified in accordance with a signal from the force sensor, and a second mode wherein the control section causes the electromagnetic valve to introduce the preselected pressure to the upper chamber of the force cylinder in response to a rate of change in the signal from the force sensor that exceeds a preselected value, a signal from the acceleration detector indicating a vertically upward acceleration of the operating section, and a signal from the detector indicating vertically upward movement of the elevation mechanism.

BRIEF DESCRIPTION OF THE DRAWINGS

Further objects, features and advantages of the present invention will become apparent from the following description of a preferred embodiment with reference to the accompanying drawings, wherein.

DETAILED DESCRIPTION OF THE PREFERRED EMBODIMENT

The entire disclosures of Japanese Pat. App. No. 09-087163, filed Feb. 28, 1997 and as published Sep. 8, 1998 as Publication No. 10-236800; Japanese Pat. App. No. 08-291018, filed Sep. 25, 1996 and as published Apr. 14, 1998 as Publication No. 10-095600; Japanese Pat. App. No. 08-266483, filed Aug. 29, 1996 and published Mar. 17, 1998 as Publication No. 10-072200; and Japanese Pat. No. 07-354942, filed Dec. 27, 1995 and published Jul. 8, 1997 as Publication No. 09-175800 are incorporated herein by reference.

Figure 1:
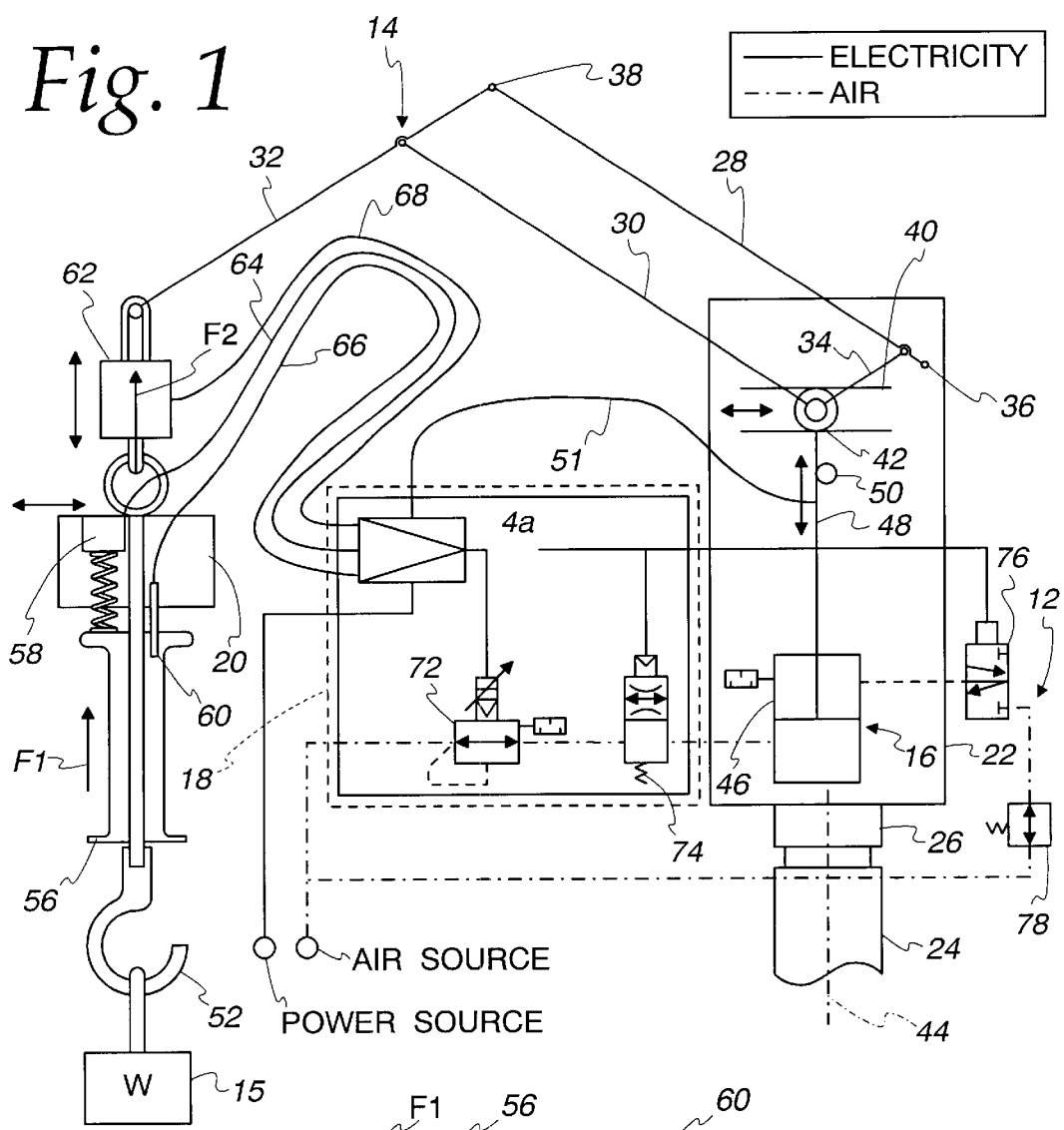
FIG. 1 is a diagrammatic illustration of a cargo handling machine embodying the present invention.

A preferred embodiment of a cargo handling machine 10 according to the present invention will now be described with reference to FIG. 1. The machine 10 includes a frame 12, an elevation mechanism 14 supported by the frame 12 for raising and lowering a cargo 15, a drive source 16 for driving the elevation mechanism 14 to raise and lower the cargo 15, a control section 18 for controlling the drive source 16, and an operating section 20 that is manipulated by a user to operate the machine 10.

The frame 12 includes a body portion 22 that is mounted on a column 24 via a swivel base 26. The elevation mechanism 14 is provided in the form of a parallel link mechanism that includes an A-arm 28, a B-arm 30, a C-arm 32, and a link arm 34. One end of the C-arm 32 is connected to the operating section 20, which in turn is connected to the cargo 15. One end of the A-arm 28 is pivoted to a stationary shaft 36 disposed on a side plate of the body portion 22, and the other end of the A-arm 28 is pivoted with one end of the C-arm 32 via a support shaft 38. A guide 40 supports a fulcrum 42 of the mechanism 14 for translation in a direction perpendicular to a vertical rotational axis 44 of the swivel base 26.

The drive source 16 is in the form of a force cylinder 46 having a piston rod 48 connected to the guide 40 to vertically raise and lower the guide 40 and the fulcrum 42 in a direction parallel to the rotational axis 44 of the swivel base 26. A speed/direction detector or sensor 50 is operably coupled to at least one of the guide 42 and the rod 48 to detect the speed and direction of movement of the guide 42 and the rod 48 as they are raised and lowered by the cylinder 46. A suitable electric signal line 51 transmits the output signals from the sensor 50 to the control section 18.

The operating section 20 includes a hook 52 on which a cargo 15 may be suspended, a grip 56 mounted to the hook 52 for translation in the vertical direction relative to the hook 52, a force sensor 58 coupled between the grip 56 and the hook 52 to sense the vertical force F1 generated by the grip 56 on the hook 52, and an on/off switch 60 mounted on the grip 56 for selective activation in response to contact and/or actuation by one or more fingers of an operator holding the grip 56. An acceleration detector 62 is coupled between the hook 52 and the C-arm 32 of the elevation mechanism 14 to sense the accelerations of the hook 52 in the vertical direction as the mechanism 14 is operated. Suitable electric signal lines 64, 66 and 68 connect the force sensor 58, the switch 60 and the acceleration detector 62, respectively, to the control section 18 to transmit the respective output signals from the force sensor 58, the switch 60, and the acceleration detector 62 to the control section 18.

The control section includes a controller 70 in the form of one or more circuit boards, an electropneumatic proportional valve 72, a flow rate switching valve 74, an electromagnetic valve 76, and a pressure regulating valve 78. The valves 72, 74, 76, and 78 are connected via appropriate conduits to a fluid power source, which in the preferred embodiment is a pressurized air source 80. The output of the valve 72 and 74 are connected to a lower pressure chamber of the cylinder 46 by suitable conduits, and the valves 76 and 78 are connected to an upper pressure chamber of the cylinder 46 by suitable conduits.

Figure 4A:
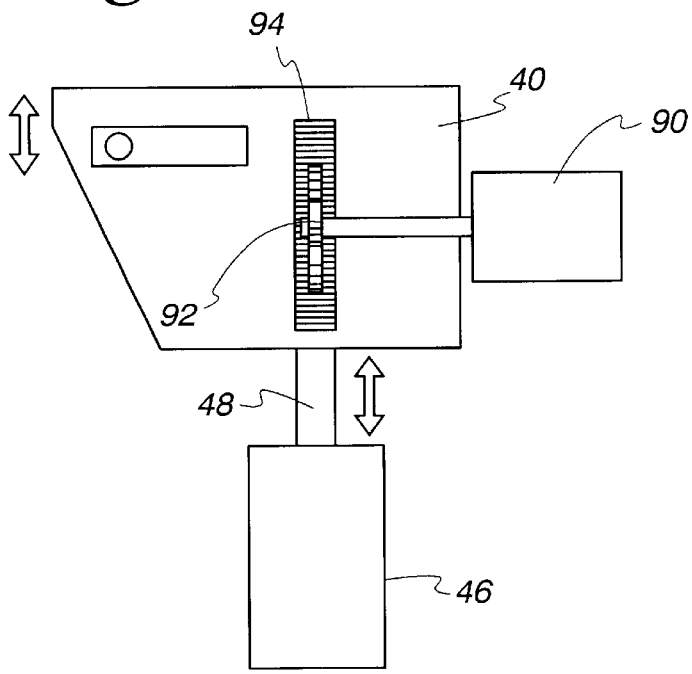
FIGS. 4A and 4B are diagrammatic illustrations of a speed and direction sensor utilized in the cargo handling machine shown in FIG. 1.
Figure 4B:
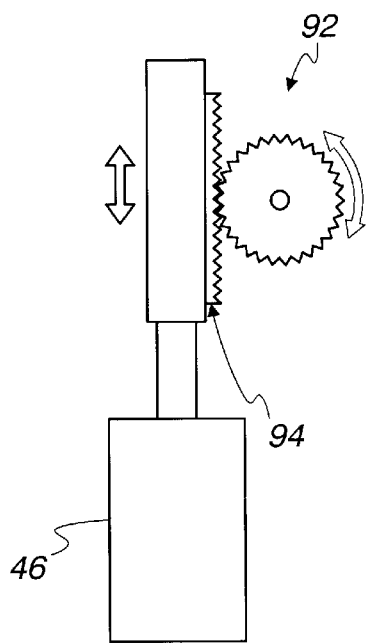

As seen in FIGS. 4A and 4B, the sensor 50 is preferably provided in the form of a tachometer generator 90 that is driven by a gear 92, which in turn is driven by a rack 94 fixed to either the rod 48 or the guide 40. The vertical direction of the movement of the elevation mechanism 14 is determined by the direction of rotation transmitted by the gear 92 to the tachometer generator 90. The vertical speed of the elevation mechanism 14 is based upon the rotational speed of the gear 92 transmitted to the tachometer generator 90 which creates a voltage signal in proportion to the rotational speed.

The respective output signals from the sensor 50, the force sensor 58, the switch 60, and the acceleration detector 62 are transmitted to the controller 70. Based on these signals, the controller 70 generates control signals to the valves 72, 74 and 76 to operate the cargo handling machine 10 in six different modes of operation as follows:

I. Normal operation;
II. Rapid descent,
III. Rapid ascent;
IV. User's hands removed from operation section during operation;
V. Fine control of position; and
VI. Cargo detach during operation.

Figure 2:
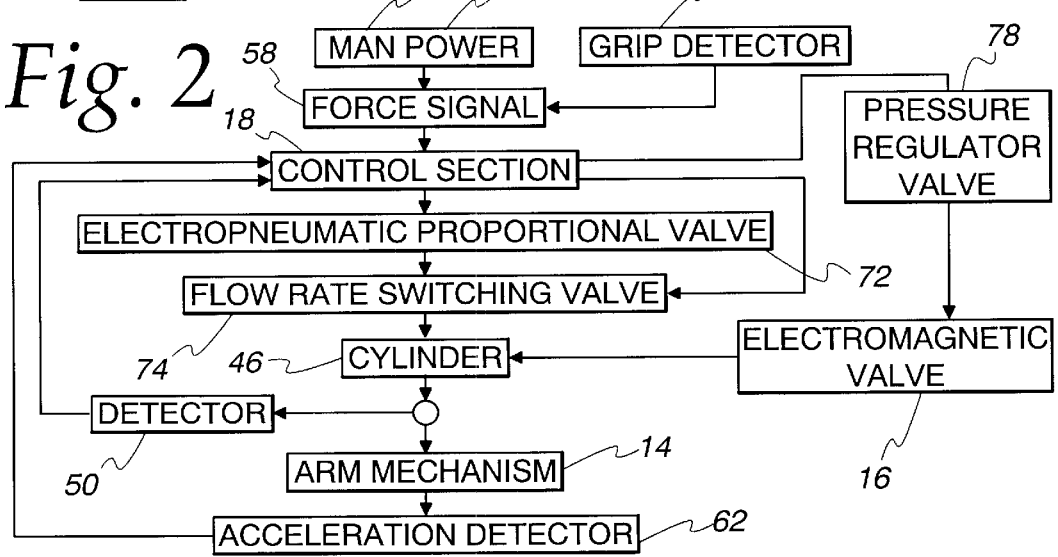
FIG. 2 is a block diagram illustrating the control architecture of the cargo handling machine shown in FIG. 1.

FIG. 2 is a block diagram illustrating the control architecture. F1 represents a lift force resulting from a user exerting a force that moves the grip 56 relative to the hook 52. A signal indicative of the lift force F1 is inputted to the controller 70 of the control section 18 through the electric wire 64. After the F1 signal is subjected to arithmetic processings, a control signal based on the F1 signal is outputted to the electropneumatic proportional valve 72 so that the cylinder 46 is supplied with an air pressure that is in proportion to the lift force F1. Thus, a hoisting force F2 is generated via an arm mechanism. The sensor 50 detects upward and downward movements of the piston rod 48 and the guide 40, and the controller 70 determines the speed and direction of movement of the cylinder 46 based on the electric signal transmitted through the electric wire 51. The electric signal outputted from the switch 60 disposed on the operating section 20 is inputted to the controller 70. In one mode, based on the signals from the sensor 50 and the switch 60, the controller 70 transmits a signal to the flow rate switching valve 74 that causes the flow rate switching valve 74 to change a flow rate of the air supplied to the cylinder 46. In another mode, based on the signals from the sensor 50, the force sensor 58, and the acceleration detector 62, the controller 70 controls the electromagnetic valve 76, which switches air flow to the upper chamber of the cylinder 46.

Figure 5:
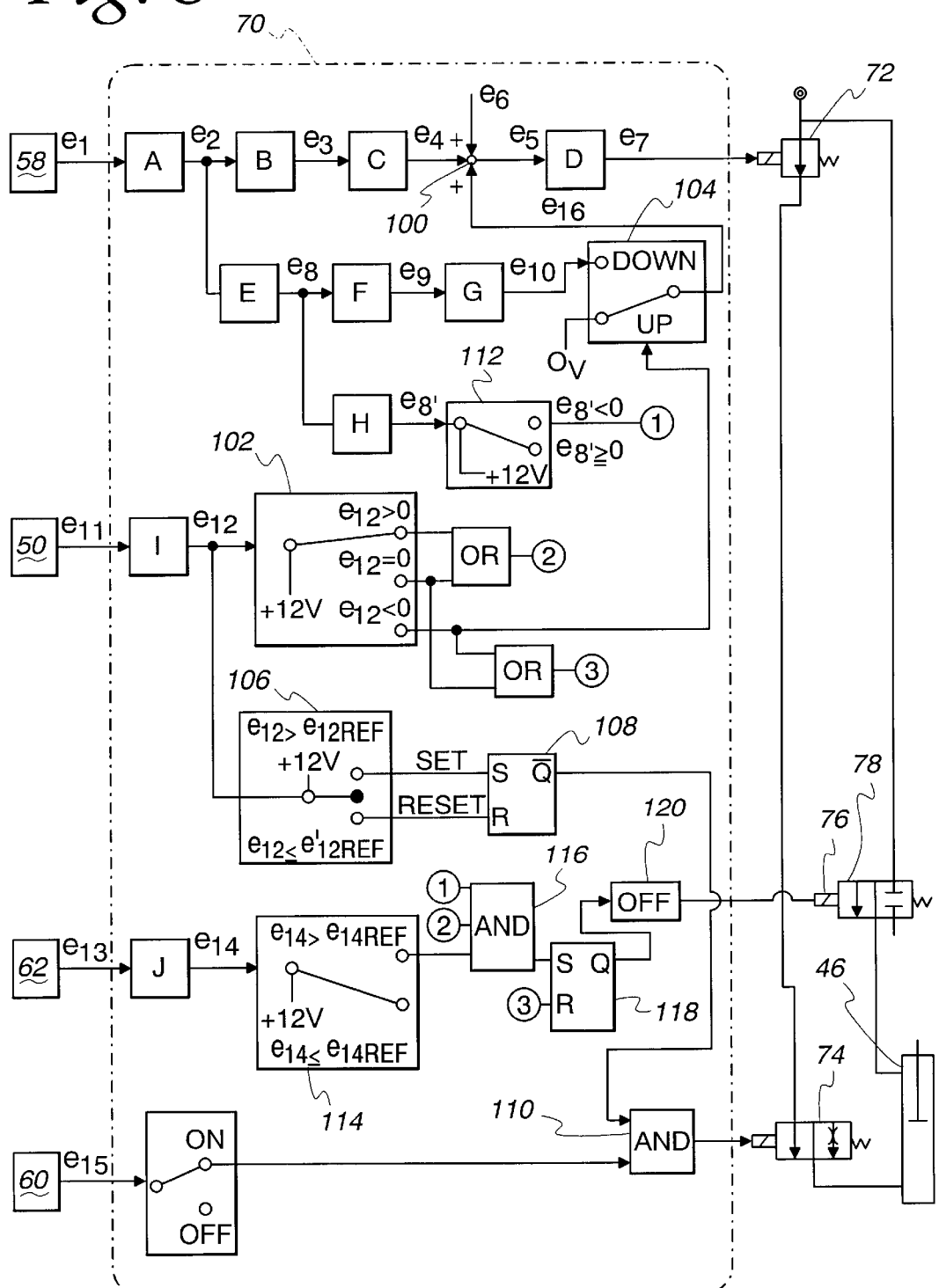
FIG. 5 is a schematic showing the control logic during normal operation of the cargo handling machine while a load is ascending.
Figure 6:
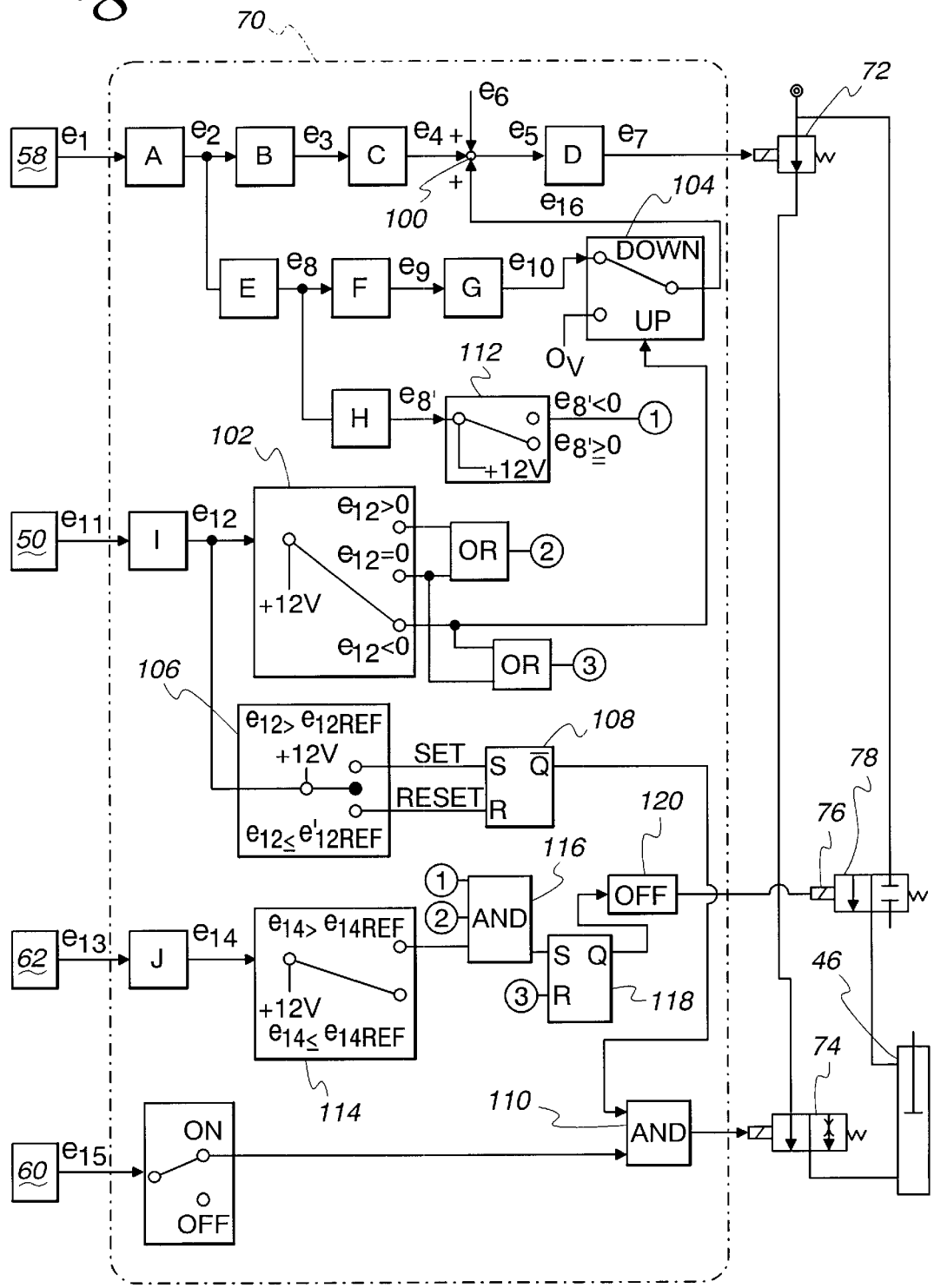
FIG. 6 is a schematic showing the control logic when the cargo handling machine is in a rapid descent mode of operation.
Figure 7:
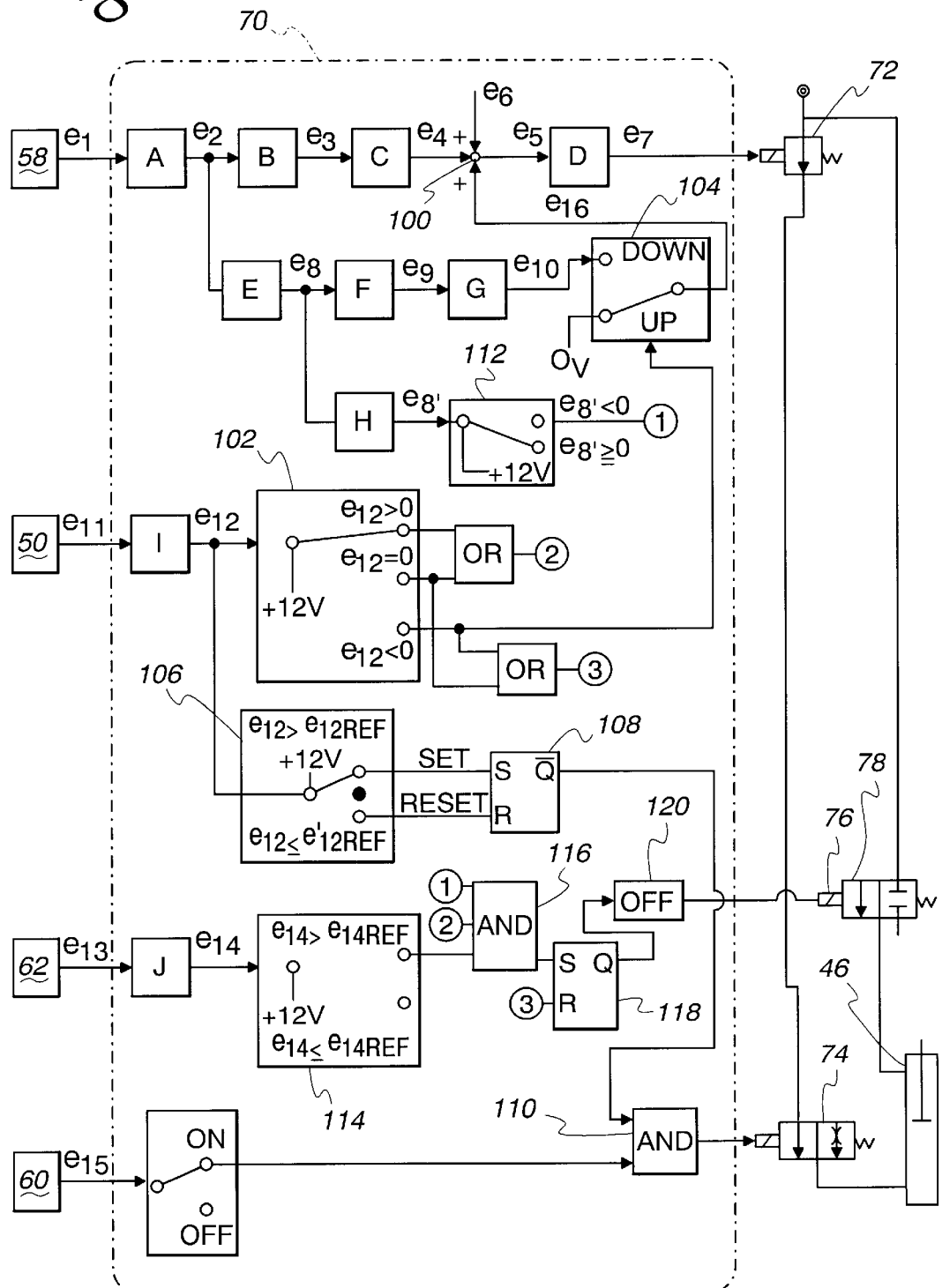
FIG. 7 is a schematic showing the control logic when the cargo handling machine is in a rapid ascent mode of operation.
Figure 8:
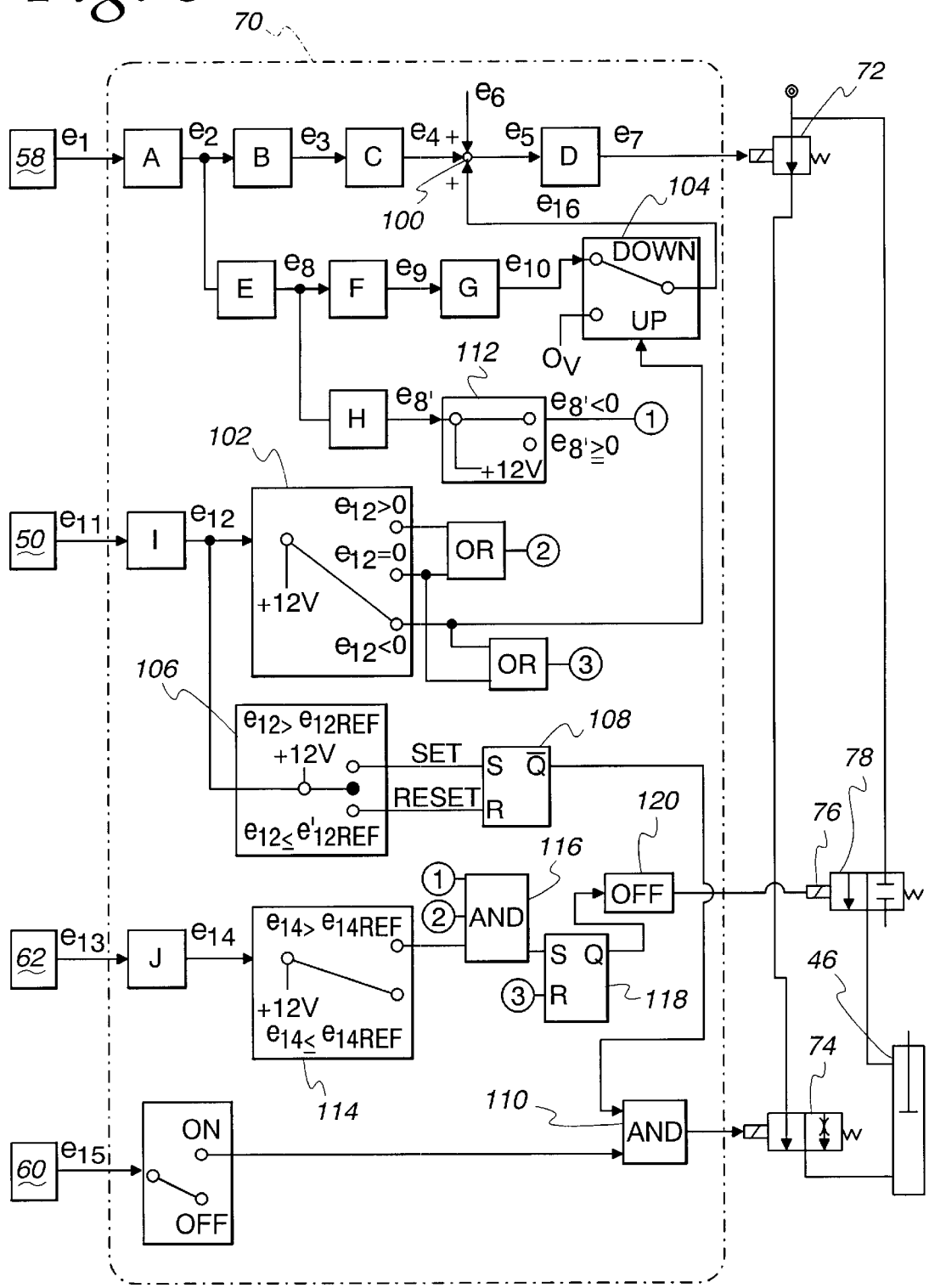
FIG. 8 is a schematic showing the control logic when a user's hands are removed from an operating section during operation of the cargo handling machine.
Figure 9:
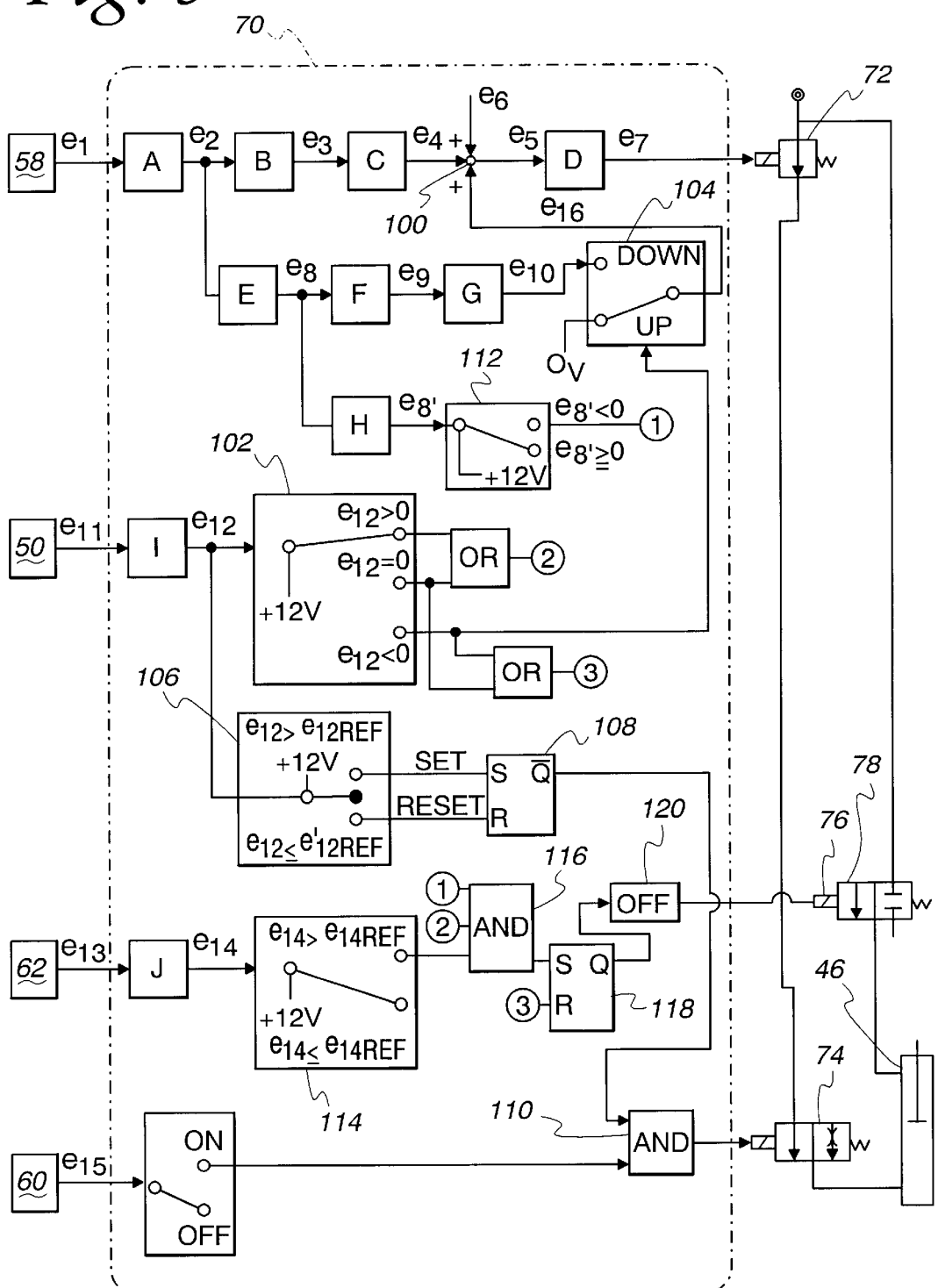
FIG. 9 is a schematic showing the control logic when the cargo handling machine is in a fine control of position mode of operation.
Figure 10:
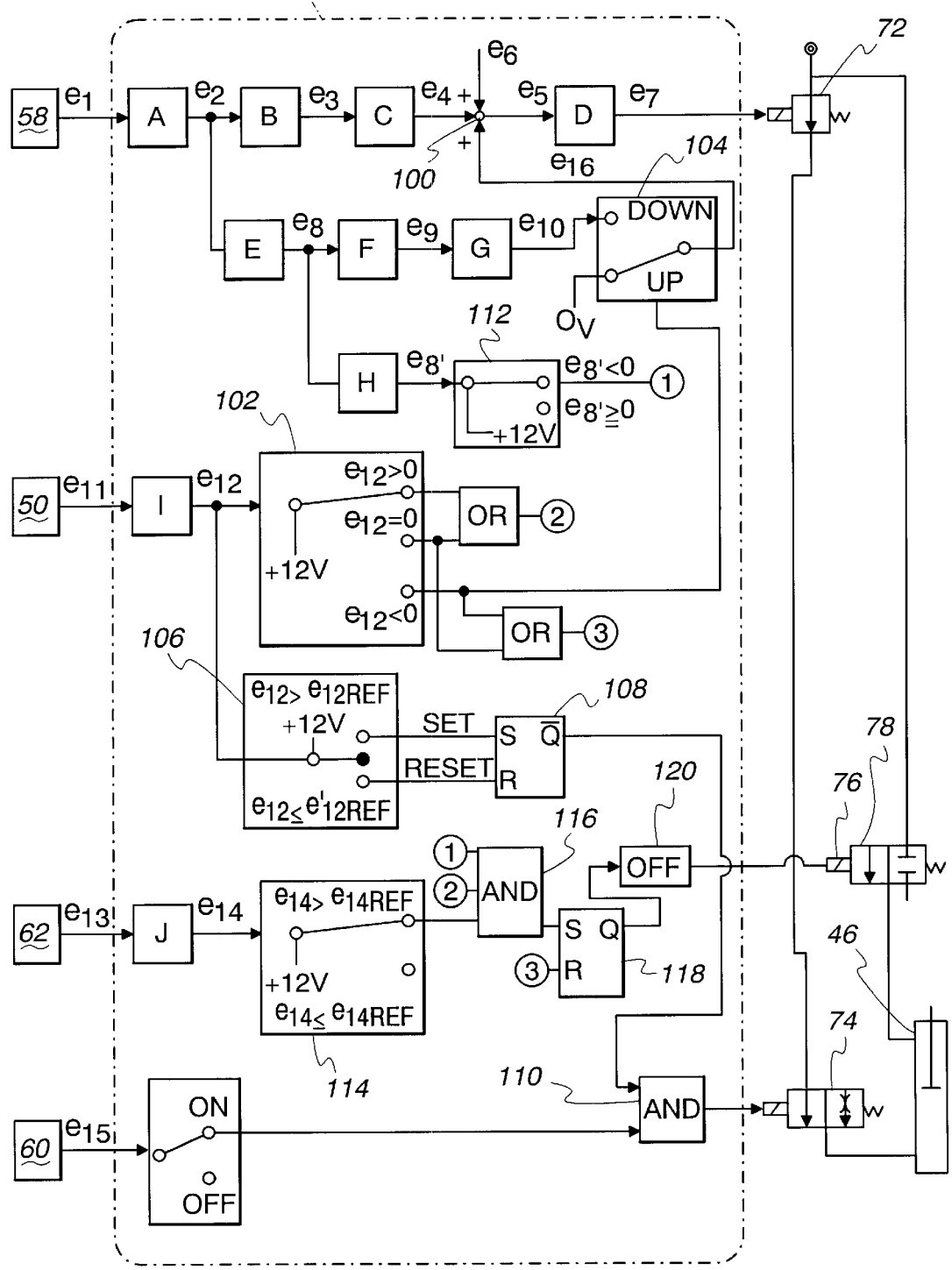
FIG. 10 is a schematic showing the control logic when a cargo has unexpected detached from the cargo handling machine during operation.

FIGS. 5–10 illustrate the control logic and processing for the cargo handling machine 10, with FIG. 5 corresponding to Mode I (normal operation), FIG. 6 corresponding to Mode II (rapid descent), FIG. 7 corresponding to Mode III (rapid ascent), FIG. 8 corresponding to Mode IV (user's hands removed), FIG. 9 corresponding to Mode V (fine control of position), and FIG. 10 corresponding to Mode VI (cargo detach during operation). The transfer functions listed below correspond to the transfer functions A–J in FIGS. 5–10:

A) $-\dfrac{R_2}{R_1} e_1$

B) $-\dfrac{R_4}{R_3} e_2$

C) $e_4 + C_1 R_6 \dfrac{de_4}{dt} = -\dfrac{R_6}{R_5} e_3$

D) $-\dfrac{R_8}{R_7} e_5$

E) $e_8 + C_2 C_3 R_9 R_{10} \dfrac{d^2 e_1}{dt^2} + (C_2 R_9 + C_3 R_{10}) \dfrac{de_5}{dt} = -C_2 R_{10} \dfrac{de_2}{dt}$ F) $e_9 + C_4 R_{12} \dfrac{de_4}{dt} = -\dfrac{R_{12}}{R_{11}} e_8$ G) $-\dfrac{R_{14}}{R_{13}} e_7$ H) $-\dfrac{R_{16}}{R_{15}} e_8$ I) $e_{12} + C_5 R_{18} \dfrac{de_{12}}{dt} = -\dfrac{R_{18}}{R_{17}} e_{11}$ -continued J) $\quad e_{14} + C_8 R_{33} \dfrac{de_{14}}{dt} = -\dfrac{R_{20}}{R_{19}} e_{13}$ Mode I. Normal Operation.

Figure 3:
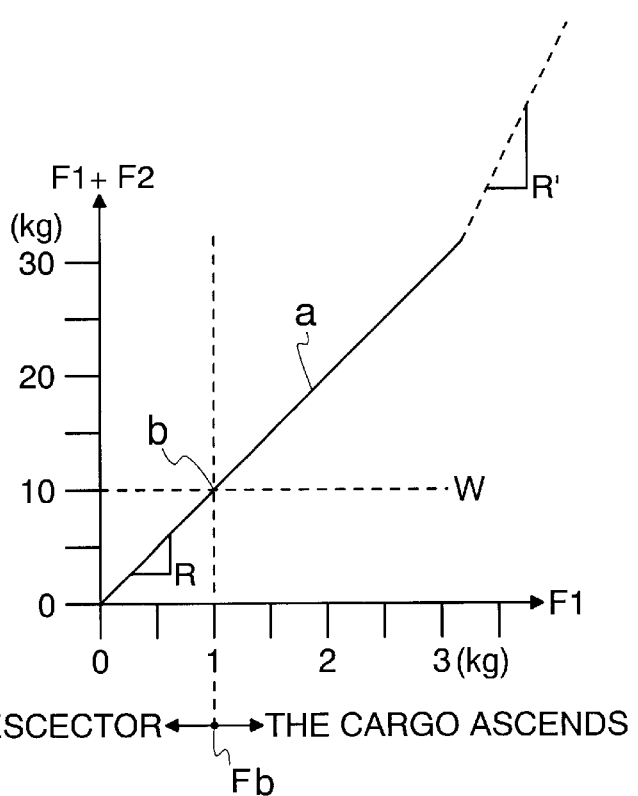
FIG. 3 is a graphical illustration of a force control used in the cargo handling machine of FIG. 1.

FIG. 3 is a graphical illustration of the force control utilized in the present invention. In FIG. 3, F1 represents the vertical force input on the grip 56 by a user, F2 represents the lift force transmitted from the elevation mechanism 14 to the hook 52, "a" represents a characteristic curve of the control system, "b" represents a balancing point at which the cargo 15 remains stationary in the air and "Fb" represents the force required to balance the cargo 15. The operation of the cargo handling machine 10 thus will now be described with reference to FIGS. 1, 3 and 5. When the grip 56 is urged upwardly by a user, a corresponding anti-gravitational force F1 is transmitted to the force sensor 58. As shown in FIG. 5, the force sensor 58 converts the force F1 transmitted thereto into an electric signal $e_1$, which is inputted to the controller 70 of the control section 18 through the electric wire 64. The electric signal $e_1$ thus inputted to the controller 70 undergoes an integral amplification processing through blocks A–D and is immediately thereafter inputted to the electropneumatic proportional valve 72 which supplies the cylinder 46 with an air pressure that is in proportion to the electric signal supplied from the force sensor 58. When the grip 56 is further raised to hoist the cargo 15 suspended on the hook 52, the anti-gravitational force F1 applied to the force sensor 58 is amplified by the controller 70 and then drives the electropneumatic proportional valve 72. More specifically, the electropneumatic proportional valve 72 adjusts the air pressure applied to the cylinder 46 to a value that is in proportion to the electric signal $e_7$ inputted to the electropneumatic proportional valve 72 by the controller 70, so that the hoisting force F2 is applied to the operating section 20. The signal $e_6$ in FIG. 5 represents the "no load" balance adjustment which is used to offset the weight of the operating section 20, elevation mechanism (14) and any attachments thereto. Additionally, it can be seen in FIG. 5 that a signal $e_{16}$ into a summation block 100 is set to zero whenever a signal $e_{12}$ from the sensor 50 and the block I indicates that the elevation mechanism 14 is ascending.

If (F1+F2)≧W, the cargo 15 can be hoisted. On the other hand, if the antigravitational force F1 is reduced to establish a relationship (F1+F2)<W, the cargo can be lowered. With reference to FIG. 3, it can be seen that the anti-gravitational force F1 is in proportion to the weight W of the cargo 15 and in inverse proportion to the amplification ratio R of the force. The larger the amplification ratio R of the force becomes, the smaller the anti-gravitational force F1 required to support the weight W of the cargo 15. In the light of the safety and operability of the control system, however, the amplification ratio R must be within an appropriate range and can be adjusted by an operator. When the grip 56 is urged to move in the antigravitational direction, i.e., vertically upward, the cargo 15 starts to ascend immediately after the force F1 exceeds the balancing force Fb. The acceleration at which the cargo 15 ascends is in proportion to a difference between the anti-gravitational force F1 and the balancing force Fb and in inverse proportion to the weight W of the cargo 15. That is, the cargo 15 can be raised at a high speed by increasing the anti-gravitational force F1. However, as the weight of a cargo increases, the acceleration at which the cargo ascends decreases. It is thus possible to raise the cargo at a safe speed in accordance with the weight thereof without requiring the user to pay an undue amount of attention. If the anti-gravitational force F1 becomes smaller than the balancing force Fb due to a reduction in the lift force applied to the grip 56 by the user, the cargo 15 starts to descend.

As can be seen from FIG. 3, the characteristic curve "a" of the control system is linear for the sake of convenience, but it may not necessarily be linear. For example, as shown by the dashed line in FIG. 3, the characteristic curve "a" can be made so that it has a different amplification ratio R' when the lifting force F1 is greater than a preselected value. Although the amplification ratio (F1+F2)/F1 assumes 10 in FIG. 3, this value is given merely for reference and the scope of the present invention is not limited thereto.

Mode II. Rapid Descent.

The following description will be centered on elevation control. In a state where the cargo 15 is in the air, the controller 70 of the control section 18 determines the speed and vertical direction of the cargo 15 based on the signal $e_{11}$ supplied from the detector 50, as shown at block I and comparator 102 in FIG. 6. If the level of the electric signal outputted from the force sensor 58 is on the decrease during a downward movement of the cargo 15, the change amount in the level of the electric signal outputted from the force sensor 58 is subjected to inverting amplification and delay processings through blocks E, F, G. The electric signal $e_{10}$ thus obtained is transmitted as signal $e_{16}$ via the switch 104 in response to a signal from the comparator 102 indicating downward movement of the elevation mechanism 14. The signals $e_4$, $e_6$, and $e_{16}$ are subjected to a summation processing in the controller 70 at the summation block 100 and thereafter inputted to the electropneumatic proportional valve 72 as electrical signal $e_7$. In this manner, the acceleration at which the cargo 15 is lowered is attenuated. Thus, the cargo is lowered at a speed artificially regulated, rather than a speed corresponding to free fall.

Mode III. Rapid Ascent.

When the operating section 20 and the cargo 15 are raised faster than a predetermined comfort speed for the user, the calculating block I of the controller substrate 70 calculates the speed and vertical direction of the cargo 15 based on the signal $e_{11}$ supplied from the detector 50 and the comparator 106 detects a speed greater than the comfort speed represented by a set point, $e_{12\ Ref}$, as shown in FIG. 7. The comparator then signals the input S of the SR flip flop or latch 108, which terminates the output signal from $\overline{Q}$, thereby terminating the signal from the AND block 110. In response to the termination of the signal from the AND block 110, the flow rate switching valve 74 operates to limit the flow rate of air supplied to the cylinder 46 and thereby controls movements of the cylinder 46 to prevent a speed greater than the comfort speed. When the grip 56 is lowered in the gravitational direction, the comparator 106 of the controller 70 determines when the speed and of the cargo 15 is less than the comfort speed by a predetermined margin, as represented by the set point $e'_{12\ Ref}$, and then transmits a signal to the input R of the latch 108 to reinitiate the output signal from $\overline{Q}$. This produces a signal from the AND block 110 which deactivates the flow rate limiting function of the valve 74. The cargo 15 is then raised or lowered under normal operation.

Mode IV. Operator's Hands Removed During Operation.

In a state where the cargo 15 is in the air, if an operator's hands are taken off the operating section 20, the switch 60 transmits a signal $e_{15}$ to the controller 70 through the electric wire 66 indicating that the switch 60 has been released, as shown in FIG. 8. In response to the off signal, the signal from the AND gate 110 of the controller 70 to the flow rate switching valve 74 is terminated. In response, the valve 74 limits the flow rate of air exhausted from the cylinder 46, thereby controlling and limiting the speed at which the cargo 15 falls so as to attenuate the impact of the cargo 15 on the floor.

Mode V. Fine Control Of Position.

When the operator desires more precise or fine control of the movement of the cargo 15, the operator can release the switch 60 while maintaining his hand on the grip 56 to operate the operating section 20. Again, as in mode IV, the switch 60 transmits an off signal to the controller 70 indicating that the switch 60 has been released. In response to this off signal, the AND gate 110 of the controller 70 terminates its output signal to the flow rate switching valve 74, thereby causing the flow rate switching valve 74 to limit the flow rate of air to and from the cylinder 46, which in turn limits the speed at which the cargo 15 may be raised or lowered, as shown in FIG. 9.

Mode VI. Cargo Detached During Operation.

If the cargo 15 detaches from the hook 56 and falls during operation, the level of the electric signal outputted from the force sensor 58 decreases rapidly. When the time rate of change in the level of the electric signal outputted from the force sensor 58 exceeds a predetermined value, this condition is detected by the controller 70. More specifically, as seen in FIG. 10, the signal for the force sensor 58 is operated on by blocks A, E, and H to create the signal $e'_8$ that is transmitted to a comparator 112, which then determine if $e'_8$ is less than zero or greater than or equal to zero. Further, based on the signal $e_{12}$ from block I of the controller 70, the comparator 102 determines if the mechanism 14 is moving vertically upward. Additionally, if the signal $e_{14}$ supplied from the acceleration sensor 62 and the block J exceeds a predetermined level represented by a set point $e_{14\ Ref}$, this state is detected by the comparator 114 of the controller 70. If all of the aforementioned conditions are met, the controller 70 transmits a control signal to the electromagnetic valve 76 which causes the valve 76 to connect the upper chamber of the cylinder 46 to the outlet of the pressure regulating valve 78 which supplies the upper chamber of the cylinder 46 with a predetermined pressure to stabilize the upward movement of the rod 48 and the elevation mechanism 14. More specifically, the comparator's 102, 112, and 114 transmit respective true signals to the AND block 116, which in turn transmits a signal to the input S of the SR flip flop or latch 118 to deactivate the signal from the Q output, thereby signaling the valve 76 to connect the upper chamber of the cylinder 46 to the outlet of the pressure regulating valve 78. A delay timer 120 installed in the controller 70 is preset for a period of time required to supply the outlet of the cylinder 46 with the primary air from the valve 78. When the set period of time elapses, the delay timer 120 signals the electromagnetic valve 76 so as to stop the supply of air to the upper chamber of the cylinder 46 and thereby achieve a normal state.

The effect of the cargo handling machine 10 according to the present invention will hereinafter be described. The force control method adopted in the present invention enables the operator to smoothly raise, hold and lower a cargo by adjusting a force to be applied to the cargo by his/her own hands. By exclusively controlling an upward force, the force control method according to the present invention performs control very similar to the case where the operator transfers cargoes single-handedly. Thus, the cargo handling machine according to the present invention ensures substantially the same operability as obtained in the case where the operator carries a light cargo by hand. Since this control method exclusively and directly controls an upward force, there is no neutral point or no insensitive range in the control system. Thus, the force control method according to the present invention provides certain advantages over conventional control methods in terms of positioning precision as well as response. Furthermore, since the weight of the cargo is indicated to the operator's hands by the amount of force F1 required to lift the cargo, the operator is able to easily discriminate heavy cargoes from light cargoes. Hence, the operator feels secure during work. The force control method of the aforementioned embodiment makes use of the electropneumatic proportional valve 72 to adjust an air pressure supplied to the cylinder. It is thus possible to hoist various cargoes that differ in weight with a rapid transition and thereby to enhance working efficiency. Moreover, since the air pressure supplied to the cylinder is constantly regulated, it is possible to prevent the occurrence of a bound phenomenon and to provide a feeling of smooth operation. Should a cargo fall to the floor, it is possible to inhibit the cargo from bounding. Still further, since the operator's hands and the cargo integrally move, it is unnecessary to correct a control force applied to a control lever in accordance with a speed at which the cargo is raised or lowered. In this respect, the cargo handling machine according to the present invention is less complex than any conventional machine. The cargo handling machine according to the present invention dispenses with a speed control method or a positional control method as conventionally employed. Thus, the cargo handling machine according to the present invention is comparatively simple in structure and can be manufactured at a low cost.

While the present invention has been described with reference to what is presently considered to be a preferred embodiment thereof, it is to be understood that the invention is not limited to the disclosed embodiment or construction. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A cargo handling machine utilizing a force control method, the machine comprising:

an elevation mechanism to raise and lower a cargo;

a drive source for driving the elevation mechanism to raise and lower a cargo;

an operating section coupled to the elevation mechanism and having a force sensor arranged to transmit a signal indicative of a vertical force applied to the operating section by a user;

a detector coupled to the elevation mechanism to transmit a signal indicative of the vertical direction of movement of the elevation mechanism; and a control section having an electropneumatic proportional valve for controlling the drive source, the control section configured to operate the cargo handling machine in a first mode wherein the control section causes the drive source to generate a hoisting force that is amplified in accordance with the signal from the force sensor, and a second mode wherein the hoisting force is reduced at an attenuated time rate of change in response to a decrease in the signal from the force sensor and a signal from the detector indicating vertically downward movement of the elevation mechanism.

2. A cargo handling machine utilizing a first control method, the machine comprising:

an elevation mechanism to raise and lower a cargo;

a force cylinder for driving the elevation mechanism to raise and lower a cargo;

an operating section coupled to the elevation mechanism and having a force sensor arranged to transmit a signal indicative of a vertical force applied to the operating section by a user;

a detector coupled to the elevation mechanism to transmit a signal indicative of the vertical speed and direction of movement of the elevation mechanism; and a control section having an electropneumatic proportional valve for controlling the force cylinder and a flow rate switching valve, the control section configured to operate the cargo handling machine in a first mode wherein the control section causes the force cylinder to generate a hoisting force that is amplified in accordance with the signal from the force sensor, and a second mode wherein the control section causes the flow rate switching valve to limit the rate of air supplied to the cylinder so as to limit a speed at which the cargo ascends.

3. A cargo handling machine utilizing a force control method, the machine comprising:

an elevation mechanism to raise and lower a cargo;

a force cylinder for driving the elevation mechanism to raise and lower a cargo;

an operating section coupled to the elevation mechanism and having a force sensor arranged to transmit a signal indicative of a vertical force applied to the operating section by a user, and a switch selectively activated by the user; and a control section having an electropneumatic proportional valve for controlling the force cylinder and a flow rate switching valve, the control section configured to operate the cargo handling machine in a first mode wherein the control section causes the force cylinder to generate a hoisting force that is amplified in accordance with the signal from the force sensor, and a second mode wherein the control section causes the flow rate switching valve to limit the flow rate of air supplied to the force cylinder so as to limit the speed at which the cargo ascends or descends.

4. A cargo handling machine utilizing a force control method, the machine comprising:

an elevation mechanism to raise and lower a cargo;

a force cylinder for driving the elevation mechanism to raise and lower a cargo;

an operating section having a force sensor arranged to transmit a signal indicative of a vertical force applied to the operating section by a user;

an acceleration detector coupling the operating section to the elevation mechanism and transmitting a signal indicative of the vertical acceleration of the operating section;

a detector coupled to the elevation mechanism to transmit a signal indicative of the vertical direction of movement of the elevation mechanism; and a control section having an electropneumatic proportional valve for controlling the force cylinder, a pressure regulating valve for supplying a preselected fluid pressure, and an electromagnetic valve for selectively introducing the preselected pressure from the pressure regulating valve to an upper chamber of the force cylinder, the control section configured to operate the cargo handling machine in a first mode wherein the control section causes the drive source to generate a hoisting force that is amplified in accordance with the signal from the force sensor, and a second mode wherein the control section causes the electromagnetic valve to introduce the preselected pressure to the upper chamber of the force cylinder in response to a rate of change in the signal from the force sensor that exceeds a preselected value, a signal from the acceleration detector indicating a vertically upward acceleration of the operating section, and a signal from the detector indicating vertically upward movement of the elevation mechanism.

* * * * *